US008223743B2

(12) United States Patent
Guvenc et al.

(10) Patent No.: US 8,223,743 B2
(45) Date of Patent: Jul. 17, 2012

(54) METHODS FOR OVER-THE-AIR BLIND SYNCHRONIZATION OF TWO OFDMA-BASED NETWORKS THAT MINIMIZES INTERFERENCE AND BY USING AN EXTENDED CORRELATION WINDOW LENGTH

(75) Inventors: Ismail Guvenc, Santa Clara, CA (US); Mustafa E. Sahin, Tampa, FL (US)

(73) Assignee: NTT DoCoMo, Inc., Tokyo (JP)

( * ) Notice: Subject to any disclaimer, the term of this patent is extended or adjusted under 35 U.S.C. 154(b) by 488 days.

(21) Appl. No.: 12/493,892

(22) Filed: Jun. 29, 2009

(65) Prior Publication Data

US 2010/0054236 A1    Mar. 4, 2010

Related U.S. Application Data

(60) Provisional application No. 61/092,678, filed on Aug. 28, 2008, provisional application No. 61/103,517, filed on Oct. 7, 2008.

(51) Int. Cl.
*H04J 3/06* (2006.01)
*H04B 7/212* (2006.01)

(52) U.S. Cl. .................. 370/350; 370/324; 370/503

(58) Field of Classification Search .......... 370/310–350, 370/503–521; 455/502, 63.1, 63.2, 114.2, 455/278.1, 296
See application file for complete search history.

(56) References Cited

U.S. PATENT DOCUMENTS

| 6,168,452 | B1 * | 1/2001 | Lai et al. ................. 439/342 |
| 6,678,339 | B1 * | 1/2004 | Lashkarian ............... 375/341 |
| 7,342,972 | B1 | 3/2008 | Giannakis et al. |
| 7,558,245 | B2 * | 7/2009 | Laroia et al. ............. 370/350 |
| 2008/0153497 | A1 | 6/2008 | Kalhan |
| 2008/0318567 | A1 * | 12/2008 | Popovic et al. .......... 455/422.1 |
| 2009/0221295 | A1 * | 9/2009 | Sahin et al. ............. 455/450 |
| 2010/0110983 | A1 * | 5/2010 | Fu .......................... 370/328 |
| 2010/0234040 | A1 * | 9/2010 | Palanki et al. .......... 455/452.2 |
| 2010/0267386 | A1 * | 10/2010 | Lim et al. ................ 455/436 |
| 2010/0322180 | A1 * | 12/2010 | Kim et al. ................ 370/329 |

FOREIGN PATENT DOCUMENTS

| WO | 2007/082409 | 7/2007 |
| WO | 2008/016246 | 2/2008 |

OTHER PUBLICATIONS

PCT International Search Report for International Application No. PCT/US2009/054934 dated Nov. 4, 2009, 2 pages.
PCT Written Opinion of the International Searching Authority for International Application No. PCT/US2009/054934 dated Nov. 4, 2009, 3 pages.

(Continued)

*Primary Examiner* — Warner Wong
(74) *Attorney, Agent, or Firm* — Haynes & Boone, LLP.

(57) ABSTRACT

Synchronization of a macrocell network with one of its sub networks (e.g., a femtocell network, a microcell network) is important for reducing the level of inter-carrier interference (ICI) that exists between the uplink users of a macrocell network and the sub-network. Even though blind synchronization techniques based on single-user signal conditions are known, the signal models are ineffective in multiuser scenarios and do not provide for reducing ICI effects. A blind synchronization method is disclosed which reduces ICI for sub network communications. Additionally, a method is disclosed which accurately and blindly synchronizes to the first user using an extended correlation window.

24 Claims, 12 Drawing Sheets

OTHER PUBLICATIONS

L. T. W. Ho and H. Claussen, "Effects of user-deployed, co-channel femtocells on the call drop probability in a residential scenario," in *Proc. IEEE Int. Symp. Personal, Indoor, Mobile Radio Commun. (PIMRC)*, Athens, Greece, Sep. 2007, pp. 1-5.

H. Claussen, "Performance of macro- and co-channel femtocells in a hierarchical cell structure," in *Proc. IEEE Int. Symp. Personal, Indoor, Mobile Radio Commun. (PIMRC)*, Athens, Greece, Sep. 2007, pp. 1-5.

M. E. Sahin, I. Guvenc, M. R. Jeong, and H. Arslan, "Opportunity detection for OFDMA systems with timing misalignment," New Orleans, LA, Nov. 2008, to appear in IEEE Global Telecommun. Conf. (GLOBECOM).

M. Tanda, "Blind symbol-timing and frequency-offset estimation in OFDM systems with real data symbols," *IEEE Trans. Commun.*, vol. 52, No. 10, pp. 1609-1612, Oct. 2004.

H. Guo, Q. Cheng, and R. Liyana-Pathirana, "Performance comparison of blind symbol timing estimation in cyclic prefixed OFDM systems," in *Proc. IEEE TENCON*, Melbourne, Australia, Nov. 2005, pp. 1-5.

J. V. Beek, M. Sandell, and P. Borjesson, "ML estimation of time and frequency offset in OFDM systems," *IEEE Trans. Sig. Processing*, vol. 45, No. 7, pp. 1800-1805, Jul. 1997.

S. Muller-Weinfurtner, "On the optimality of metrics for coarse frame synchronization in OFDM: A comparison," in *Proc. IEEE Int. Symp. Personal, Indoor, Mobile Radio Commun. (PIMRC)*, Boston, MA, Sep. 1998.

D. Wang, J. Wei, and X. Zhang, "A novel blind carrier synchronization method for MIMO OFDM system," in *Proc. IEEE Military Commun. Conf. (MILCOM)*, Orlando, FL, Oct. 2007, pp. 1-4.

M. Hua and J. Zhu, "A blind uplink OFDM synchronization algorithm based on cyclostationarity," in *Proc. IEEE Vehic. Technol. Conf. (VTC)*, vol. 2, Stockholm, Sweden, Jun. 2005, pp. 1002-1006.

H. W. Kim, S. min Lee, K. Kang, and D.-S. Ahn, "Blind time and frequency synchronization in OFDM based communication," in *Proc. IEEE Vehic. Technol. Conf. (VTC)*, Melbourne, Australia, Sep. 2006, pp. 1-5.

R. Negi and J. M. Cioffi, "Blind OFDM symbol synchronization in ISI channels," *IEEE Trans. Commun.*, vol. 50, No. 9, pp. 1525-1534, Sep. 2002.

M. Marey and H. Steendam, "Analysis of the narrowband interference effect on OFDM timing synchronization," *IEEE Trans. Sig. Processing*, vol. 55, No. 9, pp. 4558-4566, Sep. 2007.

I. Guvenc, "Statistics of Macrocell-Synchronous Femtocell-Asynchronous Users' Delays for Improved Femtocell Receiver Design", to be submitted to IEEE Communications Letters, Aug. 2008.

J. V. Beek, P. O. Borjesson, M. L. Boucheret, D. Landstrom, J. M. Arenas, P. Odling, C. Ostberg, M. Wahlqvist, and S. K. Wilson, "A time and frequency synchronization scheme for multiuser OFDM," *IEEE J. Select. Areas Commun. (JSAC)*, vol. 17, No. 11, pp. 1900-1914, Nov. 1999.

M. M. Speth, F. Classen, and H. Meyr, "Frame synchronization OFDM systems in frequency selective fading channels," in *Proc. IEEE Vehic. Technol. Conf. (VTC)*, Phoenix, AZ, May 19977, pp. 1807-1811.

\* cited by examiner

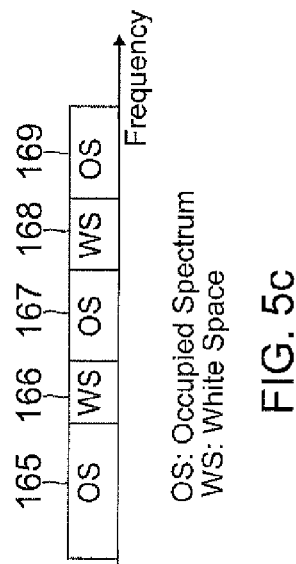
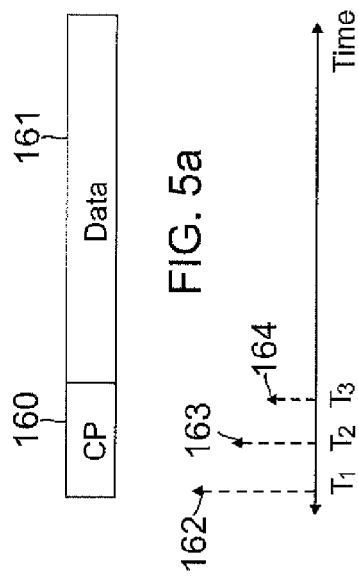
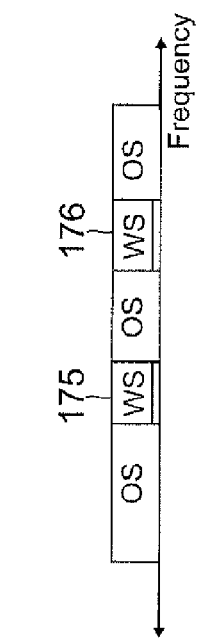
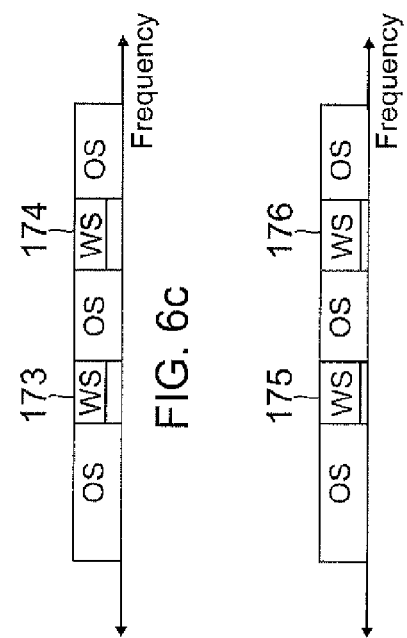
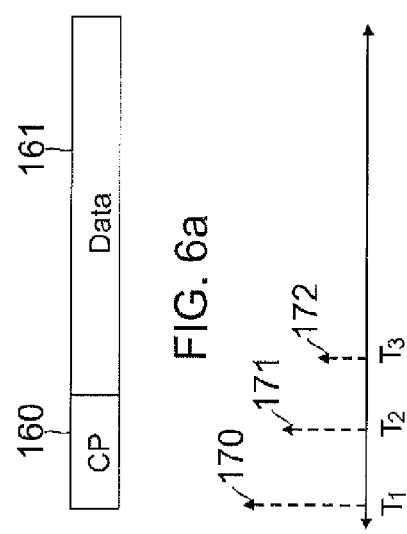

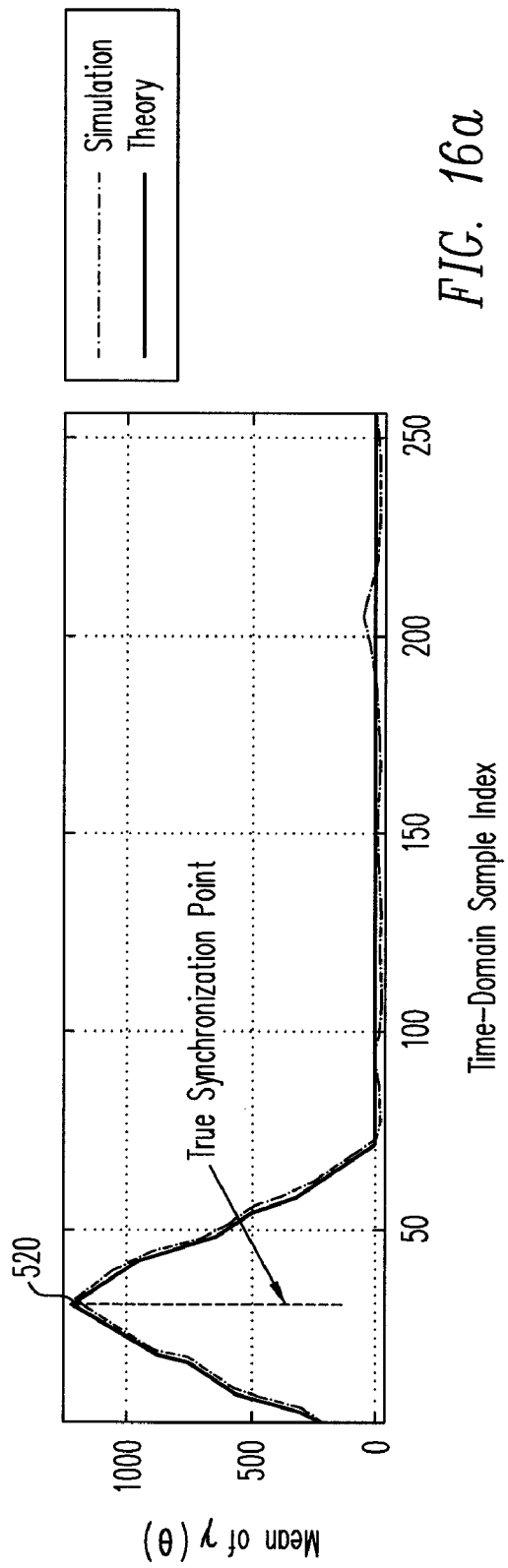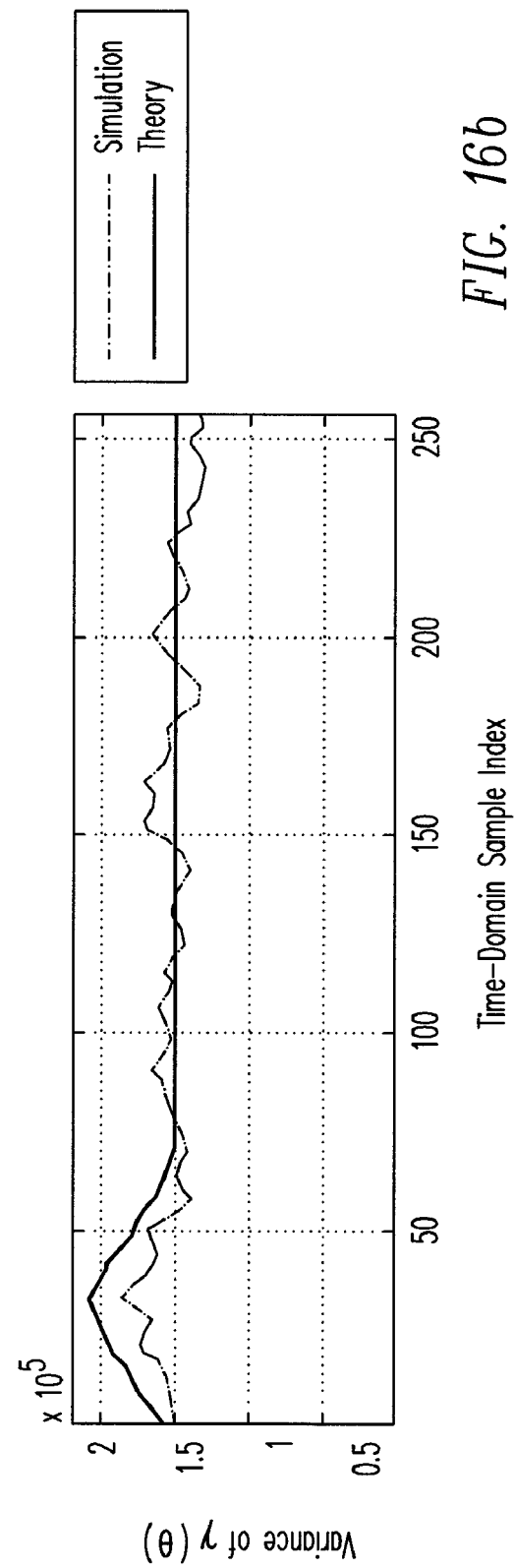

METHODS FOR OVER-THE-AIR BLIND SYNCHRONIZATION OF TWO OFDMA-BASED NETWORKS THAT MINIMIZES INTERFERENCE AND BY USING AN EXTENDED CORRELATION WINDOW LENGTH

CROSS REFERENCE TO RELATED APPLICATIONS

The present application relates to and claims priority of the copending U.S. provisional patent applications ("Copending Provisional Applications"): (a) U.S. Provisional Patent Application Ser. No. 61/092,678, entitled "A Method for Over-the-Air Blind Synchronization of Two OFDMA-Based Networks for Minimizing Interference," by Ismail Guvenc et al., filed on Aug. 28, 2008; and (b) U.S. Provisional Patent Application Ser. No. 61/103,517, entitled "Method for Over-the-Air Blind Synchronization of Two OFDMA-Based Networks Using an Extended Correlation Window Length," filed on Oct. 7, 2008. The disclosures of the Copending Provisional Applications are hereby incorporated by reference in their entireties.

BACKGROUND OF THE INVENTION

1. Field of the Invention

The present invention relates to wireless communications. More specifically, the present invention provides a method that efficiently synchronizes a sub-network base station to a macrocell network over-the-air and minimizes interference.

2. Discussion of the Related Art

A femtocell is a new type of cell in cellular communication that is located within the premises of a mobile user. A femtocell offers numerous advantages both for the operator and the consumer, such as increased data rates, improved indoor coverage, and decreased backbone traffic for the operator. Advantages of femtocells are disclosed in the articles: (a) "Effects of user-deployed, co-channel femtocells on the call drop probability in a residential scenario," by L. T. W. Ho and H. Claussen, published in *Proc. IEEE Int. Symp. Personal, Indoor, Mobile Radio Commun.* (*PIMRC*), Athens, Greece, September 2007, pp. 1-5; (b) "Performance of macro- and co-channel femtocells in a hierarchical cell structure," by H. Claussen, published in *Proc. IEEE Int. Symp. Personal, Indoor, Mobile Radio Commun.* (*PIMRC*), Athens, Greece, September 2007, pp. 1-5; and (c) "3rd generation partnership project; technical specification group radio access networks; 3G Home NodeB study item technical report," the 3GPP standard, Shangai, China, March 2008, 3GPP TR 25.820 V8.0.0 (2008-03). [available at http://www.3gpp.org/ftp/Specs/html-info/25820.htm. However, femtocells have a number of unique technical challenges, such as co-channel interference received from both the macrocell and other femtocells, hand-off and security issues.

In an orthogonal frequency division multiple access (OFDMA) based femtocell network, the femtocell may co-exist with the macrocell network by using the macrocell's unused subcarriers. In such a femtocell, as illustrated by FIG. 1, uplink (UL) signals from macrocell mobile stations (mMSs) may arrive at the femtocell base station (fBS) at different delays. As shown in FIG. 1, uplink interference from macrocell users (i.e., mMSs 101-104) are synchronized to macrocell base station (mBS) 110. However, the signals of mMSs 101-104 arrive at fBS 120 after different delays, resulting in inter-channel or inter-carrier interference (ICI).

As discussed in the article "Opportunity detection for OFDMA systems with timing misalignment" ("Sahin"), by M. E. Sahin, I. Guvenc, M. R. Jeong, and H. Arslan, presented in the IEEE Global Telecom. Conf. (GLOBECOM), New Orleans, La., November 2008, when the signal from an mMS arrives after the cyclic prefix of a femtocell user, the signal from the mMS causes considerable ICI. To prevent or reduce ICI from UL signals of a macrocell network, an fBS should preferably efficiently synchronize to the macrocell network. However, because the mMSs do not communicate directly with a femtocell, the mMSs do not transmit any pilot/training symbols to the femtocell for synchronization. Therefore, a femtocell has to "blindly" synchronize to the macrocell network through an UL received multiuser signal.

Blind time synchronization in OFDM systems are disclosed, for example, in the following articles: (a) "Blind symbol-timing and frequency-offset estimation in OFDM systems with real data symbols" ("Tanda"), by M. Tanda, published in *IEEE Trans. Commun.*, vol. 52, no. 10, pp. 1609-1612, October 2004; (b) "Performance comparison of blind symbol timing estimation in cyclic prefixed OFDM systems" ("Guo"), by H. Guo, Q. Cheng, and R. Liyana-Pathirana, published in *Proc. IEEE TENCON*, Melbourne, Australia, November 2005, pp. 1-5; (c). "ML estimation of time and frequency offset in OFDM systems" ("Beek"), by V. Beek, M. Sandell, and P. Borjesson, published in *IEEE Trans. Sig Processing*, vol. 45, no. 7, pp. 1800-1805, July 1997; (d) "On the optimality of metrics for coarse frame synchronization in OFDM: A comparison" ("Muller"), by S. Muller-Weinfurtner, published in *Proc. IEEE Int. Symp. Personal, Indoor, Mobile Radio Commun.* (*PIMRC*), Boston, Mass., September 1998; (f) "Frame synchronization OFDM systems in frequency selective fading channels" ("Speth"), by M. M. Speth, F. Classen, and H. Meyr, published in *Proc. IEEE Vehic. Technol. Conf.* (*VTC*), Phoenix, Ariz., May. 19977, pp. 1807-1811; (g) "A novel blind carrier synchronization method for MIMO OFDM system," by D. Wang, J. Wei, and X. Zhang, published in *Proc. IEEE Military Commun. Conf.* (*MILCOM*), Orlando, Fla., October 2007, pp. 1-4; (h) "A blind uplink OFDM synchronization algorithm based on cyclostationarity," by M. Hua and J. Zhu, published in *Proc. IEEE Vehic. Technol. Conf.* (*VTC*), vol. 2, Stockholm, Sweden, June 2005, pp. 1002-1006; (i) "Blind time and frequency synchronization in OFDM based communication," by H. W. Kim, S. min Lee, K. Kang, and D.-S. Ahn, published in *Proc. IEEE Vehic. Technol. Conf.* (*VTC*), Melbourne, Australia, September 2006, pp. 1-5; and (j) "Blind OFDM symbol synchronization in ISI channels," by R. Negi and J. M. Cioffi, published in *IEEE Trans. Commun.*, vol. 50, no. 9, pp. 1525-1534, September 2002. The techniques disclosed in these references perform synchronization to decode the received signal, but not for reducing or minimizing ICI between the macrocell and the femtocell.

However, blind synchronization for the multiuser case (i.e., synchronization with the UL multiuser signal) has not been described in the literature. While narrowband interference effects on blind synchronization are disclosed, for example, in "Analysis of the narrowband interference effect on OFDM timing synchronization," by M. Marey and H. Steendam, published in *IEEE Trans. Sig. Processing*, vol. 55, no. 9, pp. 4558-4566, September 2007, the system considers a pilot-aided timing estimation approach, rather than a blind estimation approach. As narrowband interference is different from multiuser interference, applicable estimation techniques may be different.

In the article, "A time and frequency synchronization scheme for multiuser OFDM," by J. V. Beek, P. O. Boijesson, M. L. Boucheret, D. Landstrom, J. M. Arenas, P. Odling, C. Ostberg, M. Wahlqvist, and S. K. Wilson, published in *IEEE J. Select. Areas Commun. (JSAC)*, vol. 17, no. 11, pp. 1900-1914, November 1999, a time/frequency synchronization scheme was disclosed for a multiuser OFDM system. However, in that system, each user is specifically separated from other users (through separation filters in the frequency domain) for the purpose of estimating each user's time/frequency offsets individually.

The purpose of a blind synchronization in a femtocell is not for decoding the received signal. Rather, efficient synchronization with the macrocell UL multiuser signal allows the femtocell to reduce ICI. As mentioned above, each mMS is typically synchronized to its own mBS. See, e.g., the initial/periodic ranging mechanism in the IEEE 802.16e standard (i.e., the "WiMAX standard"), February 2006, available at http://www.ieee802.org/16/pubs/80216e.htm. Synchronization between the mMSs with the mBS impacts the statistics of signal arrival times from mMSs to the fBS.

SUMMARY OF THE INVENTION

The present invention provides over-the-air synchronization of a sub-network (e.g., a femtocell network) to the UL of a larger network (e.g., a macrocell network). The goal of this synchronization is to reduce the ICI to the femtocell network from transmitters in a different network (e.g., a macrocell network). As the femtocell network does not decode the received signals from the transmitters of the different network, an optimum synchronization point to the different network is different than if signal decoding is desired.

According to one embodiment of the present invention, a blind synchronization method is disclosed to reduce ICI for sub network communications. Additionally, a method is disclosed which accurately and blindly synchronizes to the first user using an extended correlation window.

According to one embodiment of the invention, the method reduces interchannel interference in a femtocell network within a coverage area of a macrocell network in the presence of multiple users of the macrocell network whose signals may be detected within the coverage area of the femtocell network. The signals of the users of the macrocell network may be synchronized to a base station of the macrocell network. Both the macrocell network and the femtocell network may be OFDMA systems. The method includes (a) using a correlation metric, determining arrival times of signals from mobile users of the macrocell network received at a base station of the femtocell network; and (b) synchronizing or scheduling transmission times by users of the femtocell network based on a synchronization point derived according to the determined arrival times. The synchronization point is determined after taking into consideration an estimate of a time difference between the first arriving user delay and last arriving user delay. That time difference may be less than the CP duration of an uplink signal of the femtocell network. In that situation, the femtocell network may synchronize to the arrival time of the first arriving user. Alternatively, when the time difference is greater than the CP duration, the femtocell network may synchronize to a predetermined time that follows the arrival time of the first arriving user. The estimate of the time difference may use statistics of the arrival times of the signals of the mobile users of a macrocell network.

According to another embodiment of the present invention, when a maximum delay between the first arriving signal and last arriving signal is less than the CP duration, the femtocell network may synchronize to the first arriving user. Alternatively, when the maximum delay between the first arriving signal and the last arriving signal is greater than the CP duration, the femtocell network may synchronize the transmission times to a predetermined time following the arrival time of the first arriving user.

In one embodiment of the present invention, the delay between a signal from a first arriving macrocell mobile station and a signal from a last arriving macrocell mobile station is taken as substantially 2d/c, with d denoting the distance between a base station of the macrocell network and a base station of the femtocell network and c denoting the speed of light.

According to one embodiment of the present invention, the first user is identified by thresholding the correlation metric or by selecting from multiple peaks the one peak that has the earliest delay.

The CP duration in signals of the femtocell network may be different from those in the macrocell network. When the CP duration of the femtocell network is shorter than those of the macrocell network, the difference in duration may be used by the femtocell network to extend the symbol duration, which allows additional data to be transmitted. The extended symbol duration may use up the difference in CP durations, with the trade-off that they will be subject to increased ICI. Alternatively, the difference in CP durations allows the femtocell to maintain a silent period (without introducing any ICI), so as to reduce power consumption.

In one embodiment of the present invention, a base station of the femtocell assigns subcarriers to the users of the femtocell, according to an ICI metric for each subcarrier at the synchronization point computed at the time of assignment. The correlation metric may be computed using an extended correlation window with a longer duration than the CP durations in the macrocell network. The duration of the extended correlation window may be determined using a thresholding method. Alternatively, the duration of the extended correlation window may be determined according to a distance between the base station of the femtocell network and a base station of the macrocell network. The correlation metric may be based on Beek's estimator, Muller's estimator, Speth's estimator, or a correlation-based timing estimator.

The present invention is better understood upon consideration of the detailed description below in conjunction with the accompanying drawings.

BRIEF DESCRIPTION OF THE DRAWINGS

FIG. 5 illustrates the impact of a synchronization time point on the ICI caused by mMSs observed at the femtocell, in a first example.

FIG. 6 illustrates the impact of a synchronization time point on the ICI caused by mMSs observed at the femtocell, in a second example.

FIG. 16 shows both the theoretical and simulated means and variances of the correlation metric using an extended correlation window length (i.e., $N_{corr}=N_{CP}$, $D_{max}=23$).

DETAILED DESCRIPTION OF THE PREFERRED EMBODIMENTS

Figure 1:
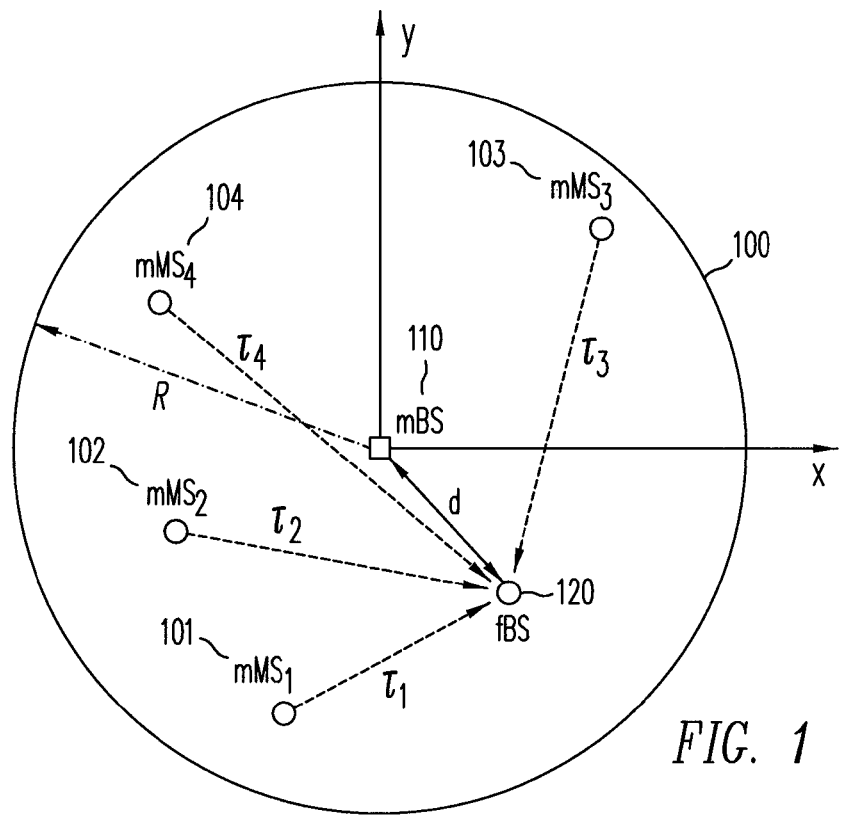
FIG. 1 shows macrocell network 100 with a coverage radius R.
Figure 2:
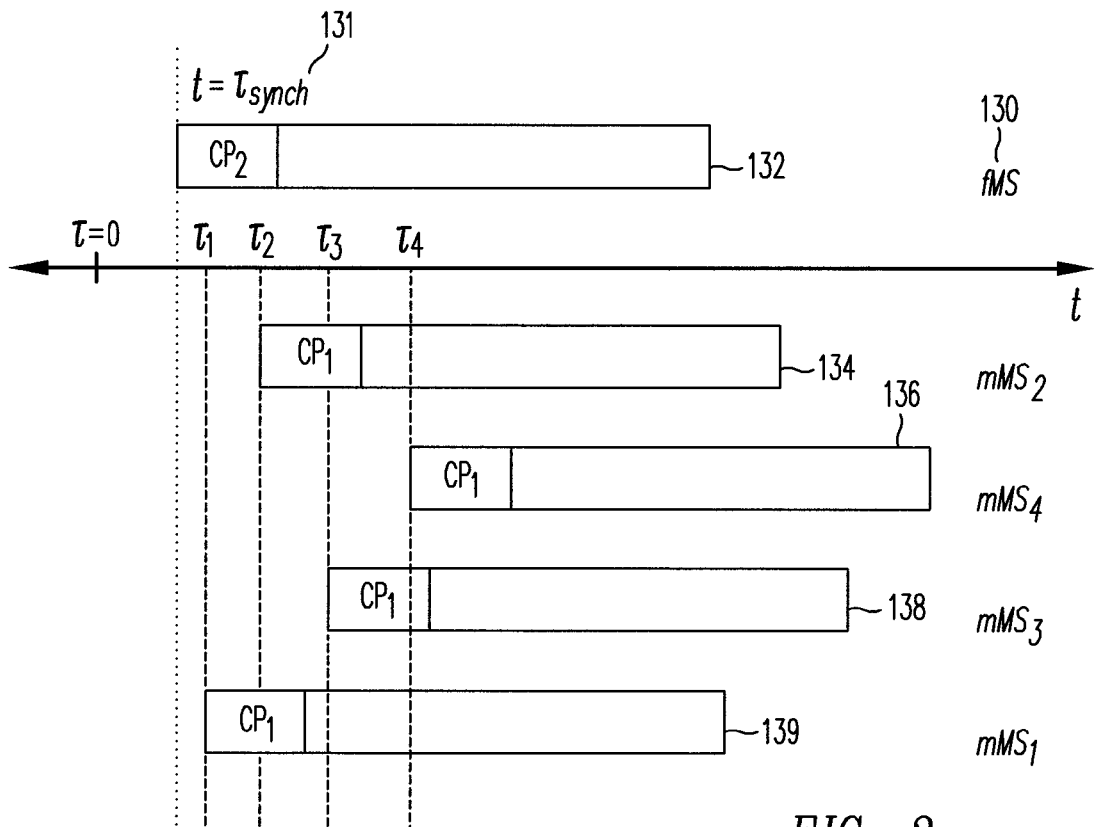
FIG. 2 shows uplink time domain signals 134, 136, 138, and 139 from $mMS_2$, $mMS_4$, $mMS_3$ and $mMS_4$, and uplink time domain signal 132 from femtocell mobile station (fMS) 130 received at fBS 120.

Although the present invention is illustrated by one or more examples that are each based on an femtocell, the present invention is applicable also to base stations of picocell networks, microcell networks and other sub-networks. FIG. 1 shows macrocell network 100 with a coverage radius R. As shown in FIG. 1, multiple mMSs 101, 102, 103 and 104 each transmit to macrocell base station (mBS) 110 over a wireless UL. These UL signals arrive asynchronously to fBS 120, which is located at a known distance d from mBS 110. In the following description, $\tau_i$ represents the signal arrival time at fBS 120 from $mMS_i$. FIG. 2 shows UL time domain signals 132, 134, 136 and 139 received at fBS 120 from $mMS_2$, $mMS_4$, $mMS_3$ and $mMS_4$, respectively, and UL time domain signal 131 received at fBS 120 from femtocell mobile station (fMS) 130. To avoid interference from the mMSs, fMS 130 may use subcarriers that are different from those used by the mMSs or may use subcarriers used by mMSs that are very far away from the femtocell. Further, signal arrival time $\tau_{synch}$ at fBS 120 for a signal transmitted by fMS 130 may be determined. The signal arrival time $\tau_{synch}$ may be fed back to fMS 130 to reduce ICI from the mMSs.

Cyclic prefix (CP) duration $T_{CP}$ denotes the length (in data samples) of the CP for a femtocell transmission. To demodulate a received fMS signal, the femtocell first removes the CP (i.e., the portion of the signal between time instants $\tau_{synch}$ and ($\tau_{synch}+T_{CP}$)). Then, a fast Fourier transform (FFT) is applied to the remainder of the signal (i.e., the signal between time instants ($\tau_{synch}+T_{CP}$) and ($\tau_{synch}+T_{CP}+T_S$)), where $T_S$ denotes the symbol duration of a femtocell signal. If any of the mMS signals arrive after ($\tau_{synch}+T_{CP}$), i.e., after the CP of the femtocell, ICI to the fMS signal may result. The ICI observed at an fBS may be reduced by adjusting synchronization point $\tau_{synch}$. Therefore, in an OFDMA system with $N_u$ users in the UL, the sampled time domain signal at the transmitter of user i can be written as:

$$x_i^{(m)}(n) = \sqrt{P_{tx,i}} \sum_{k \in \Gamma_i} X_i^{(m)}(k) e^{\frac{j2\pi k n}{N}}, -N_{cp} \leq n \leq N-1,$$

where m is the symbol index, $P_{tx,i}$ is the total transmitted power per symbol for user i, $k \in \Gamma_i$ is the subcarrier index, $\Gamma_i$ is the set of subcarriers assigned to user i out of N total subcarriers, $N_{cp}$ is the length of the CP (in number of samples), and $X_i^{(m)}(k)$ is the data on the kth subcarrier and mth symbol of the ith user. The time domain aggregate received signal is the superposition of signals from all users, each signal propagating through a different multipath channel and arriving at the receiver with a delay $\tilde{d}_i = \lceil^{31} N\tilde{\tau}_i/T \rceil$, where $\tilde{\tau}_i$ is the propagation delay experienced by user i, and T is the duration of the useful part of the symbol. Then, the aggregate discrete-time received signal can be expressed as $$y(n) = \sum_{i=1}^{N_u} y_i(n) + w(n),$$

where w(n) denotes the additive white Gaussian noise (AWGN) and $$y_i(n) = \sqrt{P_{rx,i}} \sum_{l=0}^{L-1} h_i^{(m)}(l) \times \sum_{m=-\infty}^{\infty} x_i^{(m)}(n - D_{L,i} - m(N + N_{cp})),$$

where L denotes the total number of multipath components (MPCs), $h_i^{(m)}(l)$ is the lth MPC for user i, and $D_{l,i} = \lceil N\tau_{l,i}/T \rceil + \tilde{d}_i$, where $\tau_{l,i}$ is the delay of the lth MPC for user i.

Single-user blind synchronization techniques for OFDM systems have been investigated previously. In the prior art, synchronization was intended for enhancing symbol demodulation, without concern for ICI. For example, Guo summarizes two different single-user blind synchronization methods (i.e., Beek and Muller estimators, disclosed respectively in Beek and Muller above). Guo discloses an enhancement to these estimators. In Guo, the following correlation metrics for synchronization are defined:

$$\gamma(m) = \sum_{k=m}^{m+N_{CP}-1} y(k)y^*(k+N),$$

$$\phi(m) = \sum_{k=m}^{m+N_{CP}-1} y(k)y^*(k),$$

where y(k) denotes the samples of the received OFDM signal, and $N_{CP}$ and N denote the length of the CP and the symbol duration (in samples). Speth also proposed a timing estimator ("Speth's estimator"). Beek's, Muller's, and Speth's estimators, and the correlation-based estimator, are respectively given by:

$$f_{Beek}(\theta) = |\gamma(\theta)| - \frac{SNR}{SNR+1} \frac{\phi(\theta) + \phi(\theta+N)}{2},$$

$$f_{Muller}(\theta) = |\gamma(\theta)| - \frac{\phi(\theta) + \phi(\theta+N)}{2},$$

$$f_{Speth}(\theta) = \sum_{k=\theta}^{\theta+N_{CP}-1} |y(k) - y(k+N)|^2,$$

$$f_{Corr}(\theta) = |\gamma(\theta)|.$$

Guo also modifies Beek's estimator to make it more practical. Once the selected estimator is obtained, the time index that maximizes synchronization metric $\gamma(\theta)$ is chosen as the synchronization point of the OFDM symbol.

Figure 3:
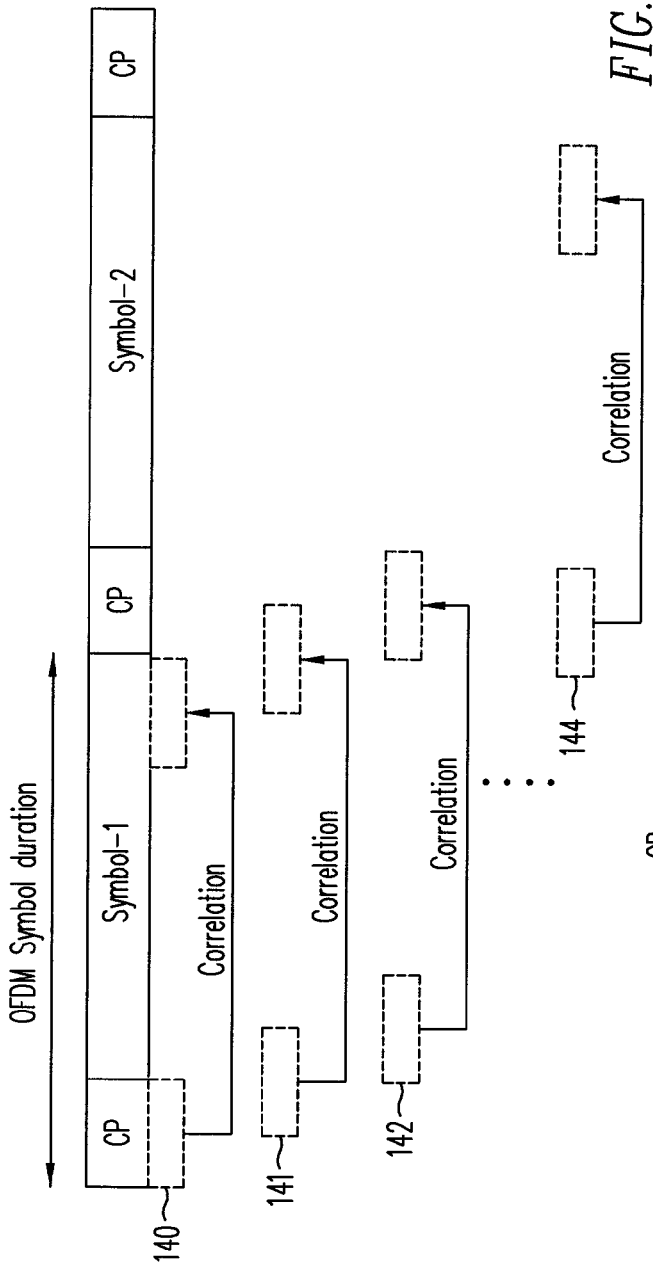
FIG. 3 illustrates how Guo's modified metric $\gamma(\theta)$ is obtained.
Figure 4:
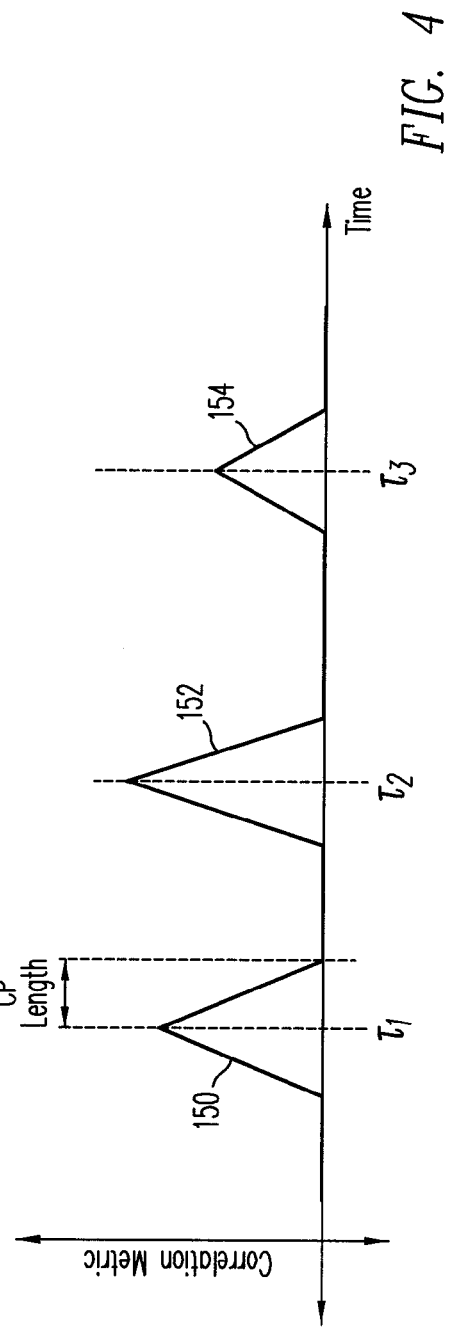
FIG. 4 shows that, in a multiuser scenario, multiple correlation peaks 150, 152, 154 may be observed, each corresponding to a different user's signal.

FIG. 3 illustrates how Guo's synchronization metric $\gamma(\theta)$ is obtained. In FIG. 3, CP-length correlations are generated for all possible time shifts within a received OFDM symbol (correlations 140, 141, 142 and 144 represent, respectively, time shifts of 1, 2, 3 and N samples). For single-user signal conditions, the correlation metric based on Beek's or Muller's estimators provides a single peak at the true time of arrival of the OFDM symbol. However, as illustrated in FIG. 4, under multiuser signal conditions, multiple correlation peaks 150, 152 and 154 may be observed, each corresponding to the arrival of a different user's signal. Note that when the delays among different users are less than the CP duration, the individual peaks may become smoother, and individual peaks may even disappear. To observe the peaks clearly, an OFDM symbol may have to be averaged over multiple symbols. Moreover, due to shadowing and short-term or long-term fading effects, first observed peak 150 may not always be the strongest peak. Hence, choosing strongest peak 152 may not always yield the arrival time of the first arriving user's signal.

The single-user blind synchronization techniques of Guo, Beek or Muller synchronize the received signal to allow appropriately decoding of the received symbols. However, efficient synchronization is difficult in the multi-user environment, and modifications of the prior-art techniques are required. In this detailed description, a femtocell is not concerned with decoding information from other mMSs; rather, the femtocell is concerned with efficiently synchronizing to the mMSs, so as to reduce the ICI to the femtocell that is caused by the macrocell network.

FIGS. 5 and 6 illustrate the impacts of synchronization time points on the ICI caused by mMSs observed at the femtocell in a first example and a second example, respectively. (The synchronization point is the arrival time of an fMS signal to an fBS, which is a design parameter determined by an fBS and communicated to its fMSs). As shown in FIG. 5(a), in which the macrocell users use occupied spectra (OS) 165, 167 and 169, the femtocell users may use white space (WS) spectra 166 and 168. As shown in FIG. 5(b), the delay between latest arriving mMs signal 164 and first arriving mMS signal 162 is $(\tau_3 - \tau_1)$, which is less than CP duration 160 of the femtocell signal (FIG. 5(a)). Therefore, if the femtocell synchronizes to first arriving mMS signal 162 (i.e., setting $\tau_{synch} = \tau_1$), the mMS signals 162, 163 and 164 would all fall within the CP duration 160 of the femtocell signal. Consequently, the femtocell's use of WS spectra 166 and 168 would be free of ICI.

However, as illustrated in FIG. 6(b), when the delay $(\tau_3 - \tau_1)$ between first arriving signal 170 and last arriving signal 172 is greater than the CP duration of the femtocell, synchronization is difficult. If the femtocell synchronizes to the first arriving mMS signal 170 (i.e., $\tau_{synch} = \tau_1$), later arriving signal 172 is not within CP duration 160 of the femtocell signal. As illustrated in FIG. 6(c), ICI is introduced into WS spectra 173 and 174, which would normally be utilized by the femtocell network. FIG. 6(d) illustrates a decreased level of ICI within WS 175 and 176 using more efficient synchronization methods of the present invention, described below.

Figure 7:
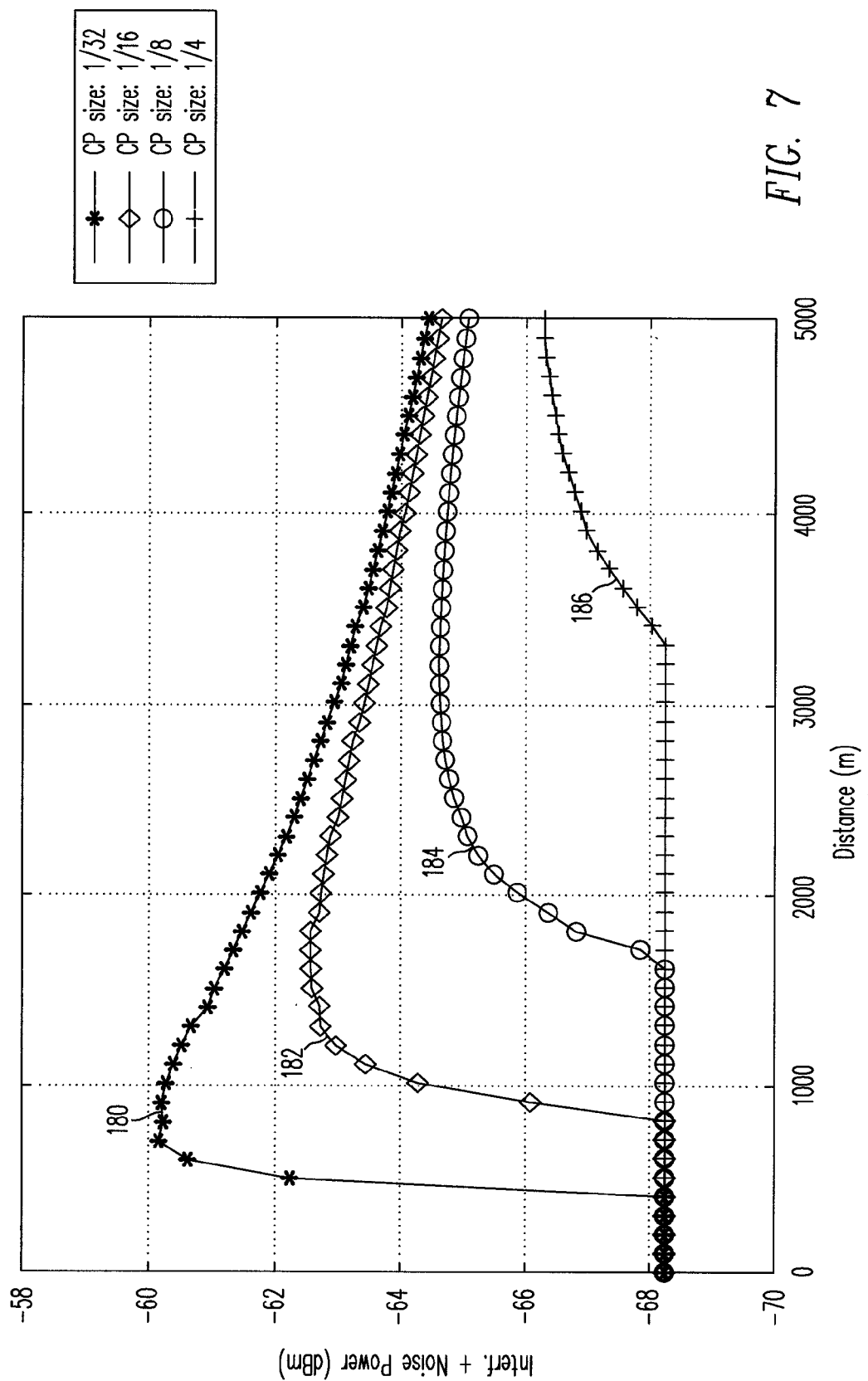
FIG. 7 shows representative simulation results on the impact of mMS-fBS distance (i.e., the signal arrival time) on the ICI for an AWGN channel.
Figure 8:
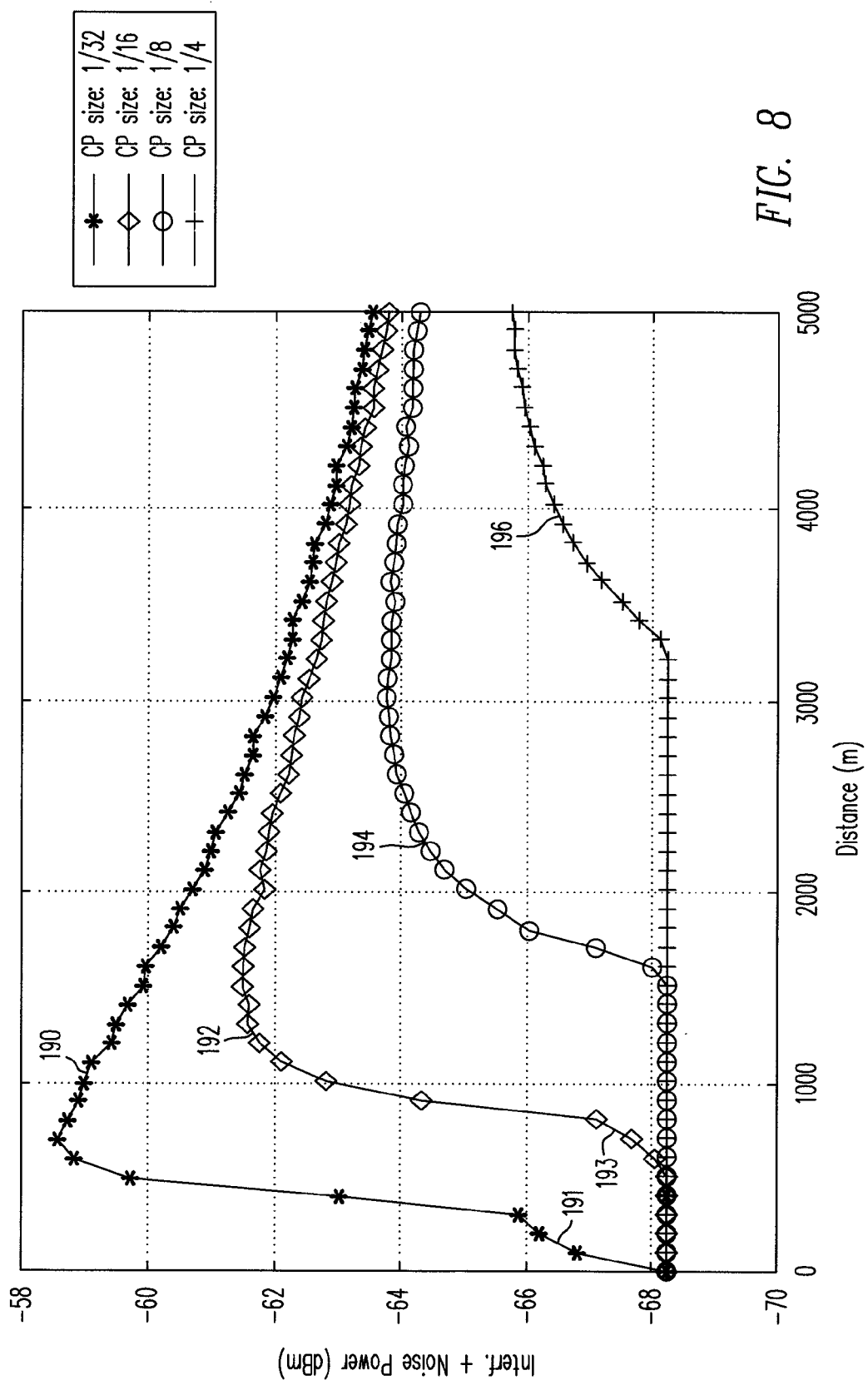
FIG. 8 shows representative simulation results on the impact of mMS-fBS distance (i.e., the signal arrival time) on the ICI for a multipath channel (6-tap ITU-R Vehicular A Channel Model, with a maximum excess delay of 2.51 μsec).

FIGS. 7 and 8 show representative simulation results on the impact of mMS-fBS distance (i.e., the signal arrival time) on ICI for AWGN and multipath channels (6-tap ITU-R Vehicular A Channel Model, with a maximum excess delay of 2.51 μsec), respectively. The simulation results of FIGS. 7 and 8 are obtained assuming a free-space path loss. As shown in FIGS. 7 and 8, the effect of the distance between the mMS and fBS on ICI is two-fold. First, a larger distance between the mMS and fBS leads to a larger delay, and hence, a higher ICI. Second, as a signal's path loss increases with the distance between the mMS and fBS, ICI decreases with that distance. The simulation results show:

(a) ICI from an mMS signal is insignificant, if the mMS signal arrives within the CP duration of the femtocell signal.

(b) ICI increases when the range of signal arrival times exceed the CP duration;

(c) due to attenuation, ICI peaks decrease with the fBS-mMS distance;

(d) in a multipath channel, ICI exists for CP=1/32 even for small distances (see ICI values 191 and 193 of FIG. 8), since the maximum excess delay is greater than the CP duration;

(e) ICI is greater for a multipath channel (see ICI peaks 190, 192, 194 and 196 in FIG. 7), as compared to an AWGN channel (see ICI peaks 180, 182, 184 and 186 in FIG. 8), because of the greater delays of the individual multipath components, even if both channels have the same average symbol energy; and (f) ICI decreases with CP duration, regardless of the distance.

Figures 9A, 9B:
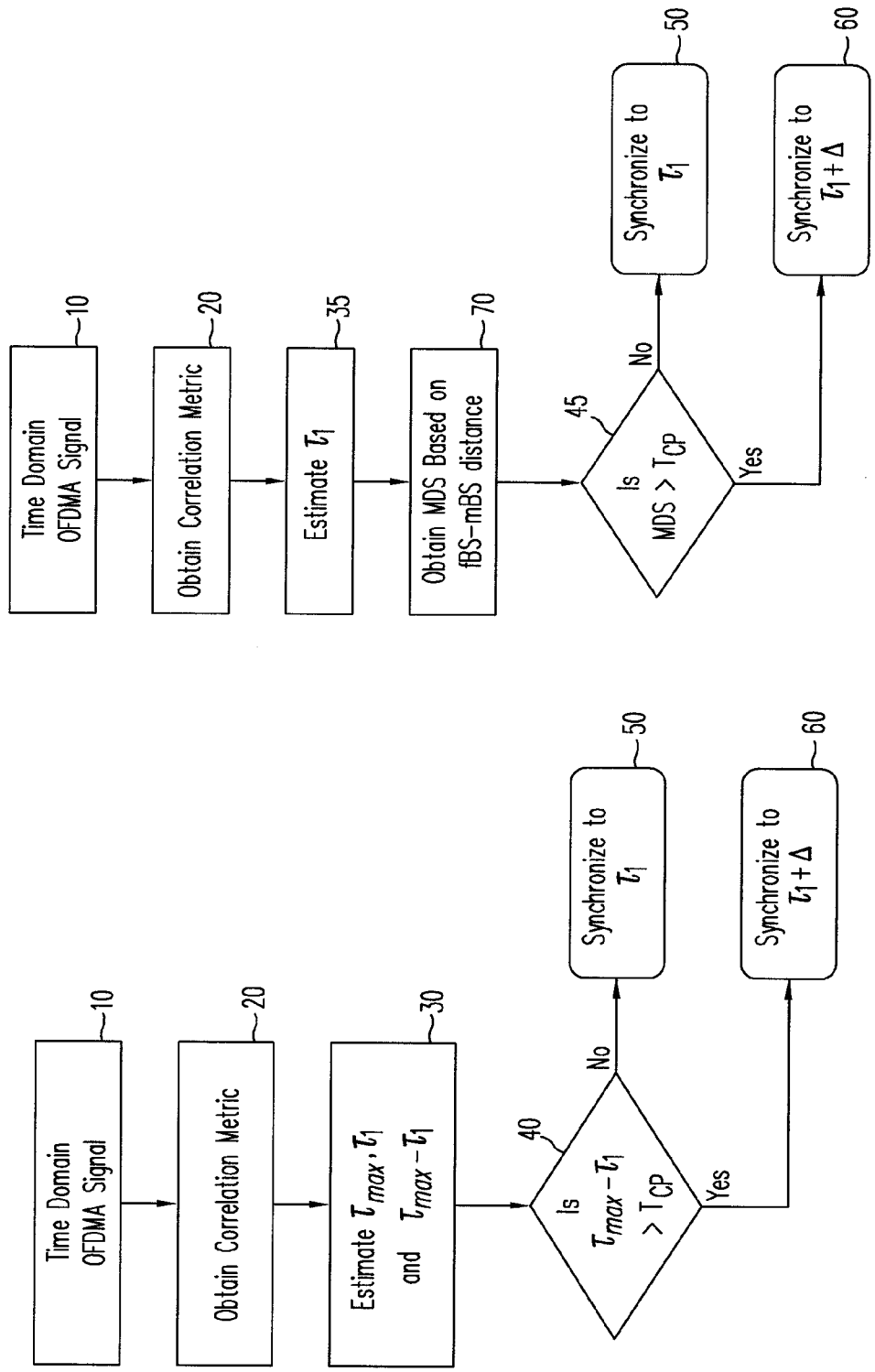
FIGS. 9(a) and (b) illustrate two techniques for efficiently synchronize to a macrocell signal that minimize ICI effects on a femtocell network, in accordance with the present invention.

FIGS. 9(a) and (b) illustrate two techniques for efficiently synchronizing to a macrocell signal that minimize ICI effects on a femtocell network, in accordance with the present invention. As shown in FIG. 9(a), at step 10, an OFDMA signal is received. At step 20, a single-user correlation metric is derived from the received OFDMA signal. (As discussed above, when there are multiple users, the single-user correlation metric may include multiple peaks.) Then, at step 30, the delay between the latest arriving user's signal ($\tau_{max}$) and the first arriving user's signal ($\tau_1$) are estimated. When the difference ($\tau_{max} - \tau_1$) is less than the CP duration ($T_{CP}$), the femtocell synchronizes at step 50 to the first arriving user signal $\tau_1$, which would result in insignificant ICI from the macrocell network. However, when the difference (i.e., $\tau_{max} - \tau_1$) is greater than the CP duration, synchronization to the first arriving user's signal (e.g., as signal 170 of FIG. 6(b)) leave later arriving users signals outside the CP duration of the femtocell (e.g., signal 172 of FIG. 6(b)). Therefore, at step 60, the femtocell synchronizes to a point ($\tau_1 + \Delta$) to reduce the impact of ICI. The synchronization point may still be $\tau_1$ and possibly also some later arriving user's delays outside the CP duration of the femtocell, resulting in ICI from the later arriving signals of these users. However, if $\Delta$ is appropriately selected, mitigation of ICI may still result. One examplary way to select the synchronization point is to select $\Delta = \tau_{sync} - \tau_1$, where $$\hat{\tau}_{sync} = \underset{\tau_{sync}}{\arg\min} \sum_{i=1}^{N_u} [u(\tau_{sync} - \tau_i)E_i|\tau_{sync} - \tau_i| +$$

$$u(\tau_i - \tau_{sync} - T_{CP})E_i|\tau_i - \tau_{sync} - T_{CP}|]$$

and $E_i$ denotes the received signal energy of the ith user (or, alternatively, peak value of the correlation metric for different users, as illustrated by FIG. 4), and u(t) is the unit step function (i.e., the function that has a value of 0 for t<0, and that has a value of 1 for t≧0). The insight behind the equation is a cost function that is minimized with respect to the synchronization point. For a given synchronization point, the users' delayed signals fall either within the CP our outside the CP. When the delays are outside the CP, the user delayed signals arrive either earlier than the CP or later than the CP. When the users' delayed signals arrive within the CP duration, the cost function does not impose any penalty (i.e., the corresponding terms are zero because of the unit step function). When the users delayed signals arrive earlier or later than the CP duration, the cost function increases by the product of $E_i$ and the delay between the starting point of the CP (corresponding to a user's delayed signal arriving earlier than the CP) or the ending point of the CP (corresponding to a user's delayed signal arriving later than the CP). Since the starting point of the CP corresponds to the synchronization instant $T_{synch}$, the cost function may be minimized by changing $T_{synch}$ and choosing a value that minimizes the overall cost function.

Figure 10:
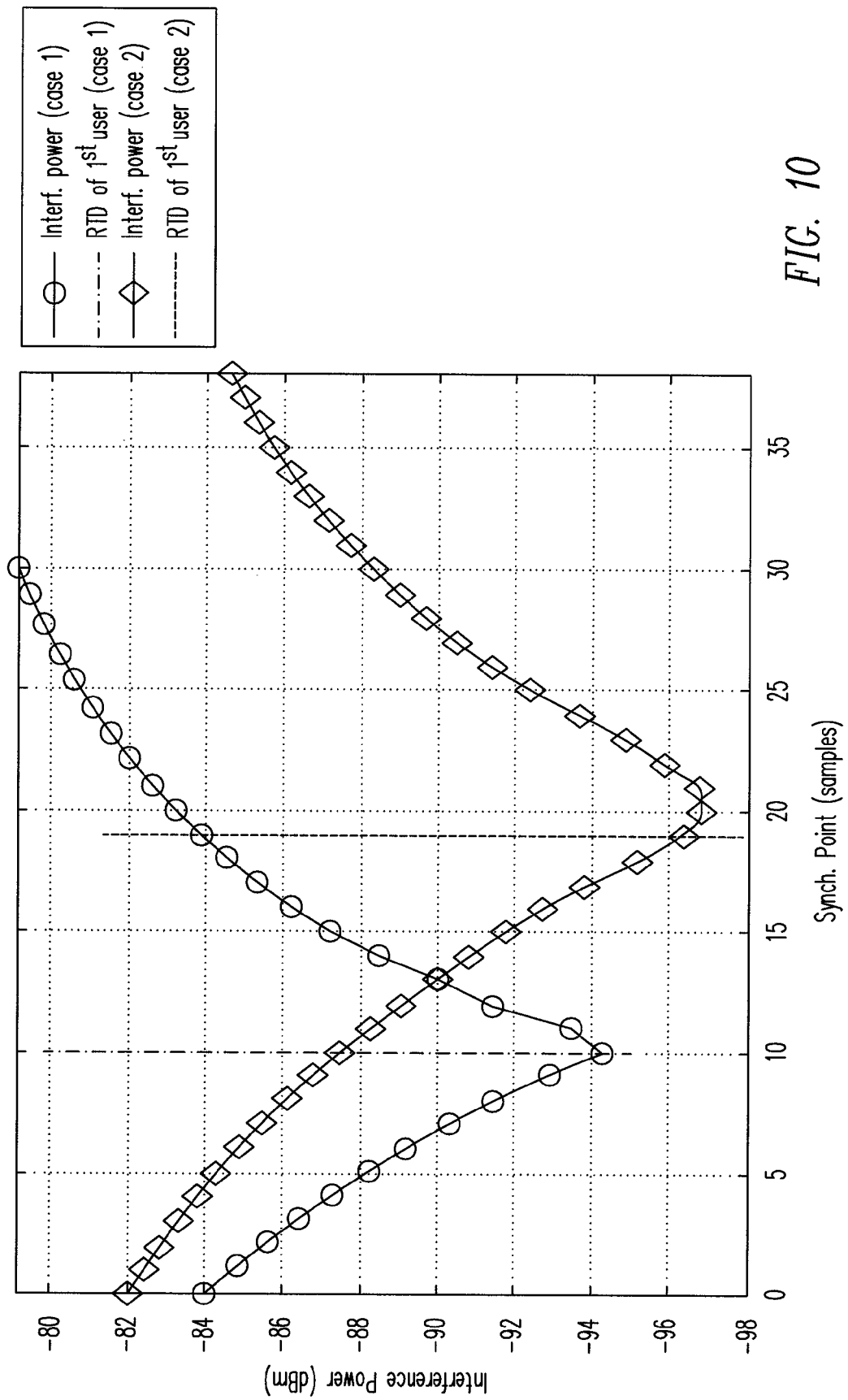
FIG. 10 provides an example illustrating the effect of the synchronization point on the ICI power and the first arriving user's delay, under different scenarios.

The synchronization point may be determined also in other ways and using other metrics. For example, the ICI may be explicitly calculated using, for example, a method disclosed in Sahin, as well as in "ICI-Minimizing Blind Uplink Time Synchronization for OFDMA-Based Cognitive Radio Systems" ("Guvenc"), by I. Guvenc, M. E. Sahin, S. Tombaz, and H. Arslan, submitted to the *IEEE Global Telecom. Conf.* (*GLOBECOM*), Hawaii, November 2009, and the synchronization point may be selected as the synchronization point that minimizes ICI for a specified subcarrier. Let $I_i(k)$ denote the ICI signal caused by $mMS_i$ on subcarrier k used by fMS-1. Assuming a single occupied subcarrier $p_i$ from each user for notational brevity, the total ICI power observed by fMS-1 is given by (as disclosed in Guvenc)

$$\sum_{k \neq p_i} I_i^2(k) = \sum_{i=1}^{N_u} E_{sc,i} \sum_{k \neq p_i} \frac{1 - \cos\left(\frac{2\pi(p_i - k)}{N}(D_{1,i} - \xi - N_{CP})\right)}{1 - \cos\left(\frac{2\pi(p_i - k)}{N}\right)}$$

where $E_{sc,i}$ is the average received energy per subcarrier for $MS_i$, and $\xi$ denotes the synchronization point. Guvenc shows that the value of $\xi$ that minimizes ICI, i.e., the optimum $\xi$, can be obtained by differentiating the above equation with respect to $\xi$ and equating it to 0. When the signal power is distance-dependent, synchronizing to the first arriving user's signal typically minimizes the ICI in most cases, or makes ICI sufficiently small. FIG. 10 provides a simple example, in which total ICI is plotted with respect to the synchronization point under two operating conditions. A free space path loss is assumed with parameters N=512 and $N_{CP}$=16 (i.e., $T_{CP}$=2.8 μs). Under the first operating condition, the distances of the 12 macrocell users to the opportunistic network are assumed to be at [250, 300, . . . , 800] m (corresponding to a delay of 20 samples between the first and last users' signals), respectively. Under the second operating condition, the distances of the 12 macrocell users are assumed to be at [500, 550, . . . , 1050] m (corresponding to a delay of 21 samples between first and last users' signals). Because the spread of the signals under both operating conditions (i.e., 20 and 21 samples) is greater than the CP duration (which is 16 samples), ICI is always present, regardless of the synchronization point. As shown in FIG. 10, the when the opportunistic network synchronizes to the first arriving macrocell user signal accurately (i.e., $T_{synch}$=$T_1$), observed ICI power is minimum under the first operating condition, and close to the minimum under the second operating condition (there may be other operating conditions where the synchronization instant is at a noticeable later time instant than the first user's arrival time). The primary reason for the difference in the second operating condition is that due to the longer time delays of the users, first arriving user's signal is attenuated more strongly compared to the first operating condition. Therefore, the synchronization point in the second operating condition may leave the first user's signal outside the CP duration so as to minimize the overall ICI contribution of the signals arriving after the CP duration.

The parameters required for evaluating an optimal synchronization point include the arrival times ($\tau_i$) of mMS signals and the correlation metric at each delay value. The peaks of the candidate correlation metric may be selected from a number of peaks of the correlation metric that exceed a threshold. The peak of the correlation metric that has the earliest delay may be selected. That first arriving user's delay is assigned $\tau_1$. When individual delays cannot be estimated, but $\tau_1$ and $\tau_{max}$ may be determined, then the synchronization point can be found by considering a 2-user scenario and using the method for selecting Δ, as discussed above.

As discussed above, individual delays may not be easy to estimate under multiuser signal conditions. However, statistics of the arrival times of the mMS signals may be used. For example, as disclosed in "Statistics of macrocell-synchronous femtocell-asynchronous users' delays for improved femtocell uplink receiver design" ("Guvenc2"), I. Guvenc, *IEEE Communications Letters*, Volume 13, Issue 4, April 2009 Page(s): 239-241, we may consider that the mMSs of a macrocell network—assumed to be uniformly distributed over a circular cell of radius R—are synchronized to an mBS, and hence the maximum delay spread (MDS) estimate may be derived to be equivalent to 2d/c, where d is the distance between an fBS and an mBS, and c is the speed of light. The MDS corresponds to the maximum value for ($\tau_{max}$−$\tau_1$). Such a model is less accurate, as compared to a model based on exact delays of the mMSs (which are, however, difficult or impractical to estimate). For a macrocell network with a large number of mMSs, the MDS may still closely approximate the true ($\tau_{max}$−$\tau_1$) value.

FIG. 9(*b*) illustrates a method for synchronization based on obtaining an MDS value from an fBS, in accordance to one embodiment of the present invention. As shown in FIG. 9(*b*), after obtaining a correlation metric at step 20 (as in FIG. 9(*a*)), time $\tau_1$ corresponding to the time of arrival by the first arrival signal is estimated at step 35. The MDS is then obtained at step 70, which is then compared with the CP duration $T_{CP}$ (step 45). If the MDS is less than the CP duration, at step 50, the femtocell may be synchronized to first arrival time $\tau_1$ without risk of ICI. If the MDS is greater than the CP duration, at step 60, the femtocell synchronizes to the synchronization point ($\tau_1$+Δ) to reduce ICI. The value of Δ may be selected according to the relative value of MDS and $T_{CP}$; for a greater MDS value, a greater Δ value should be selected.

Figure 11:
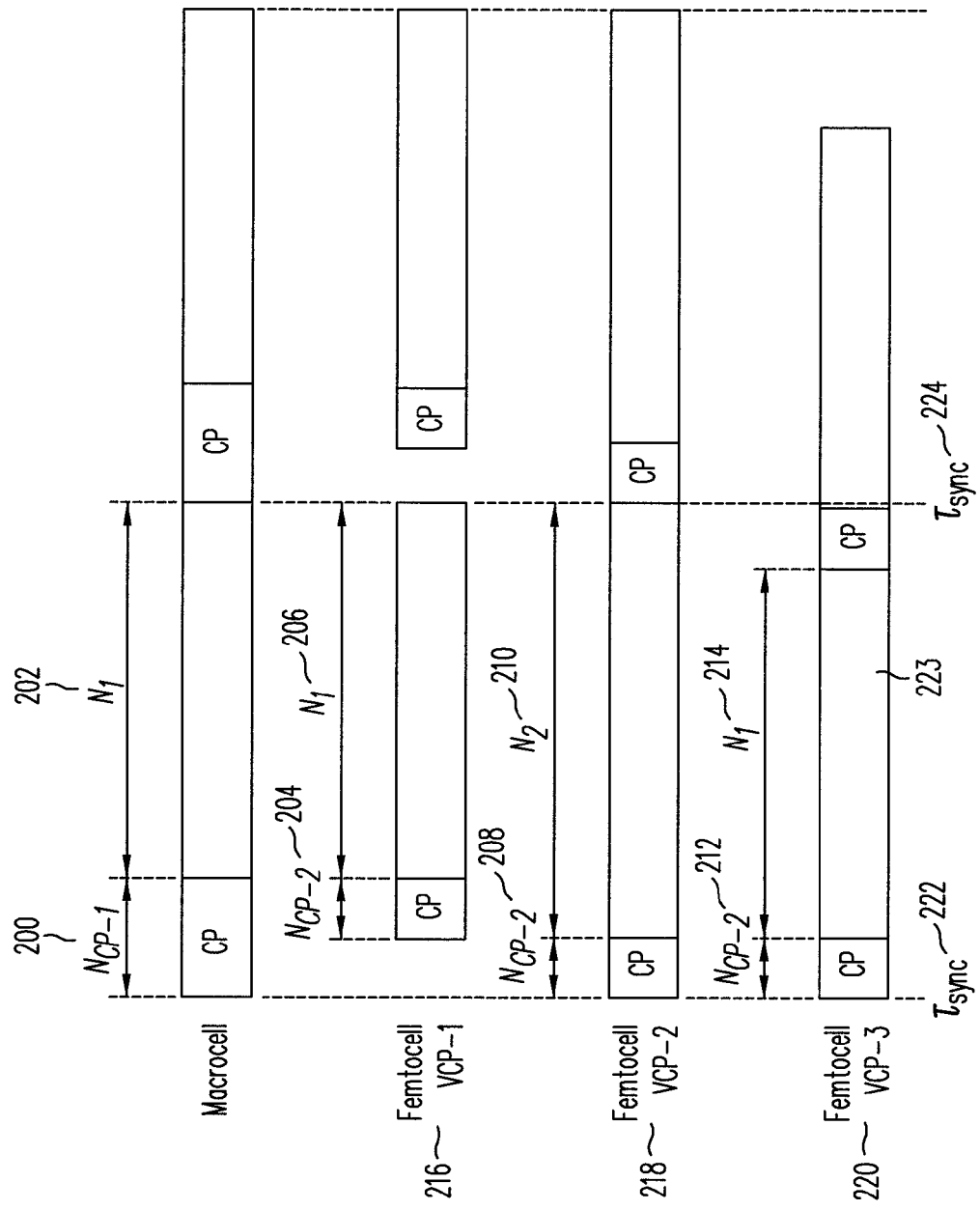
FIG. 11 provides three variable CP (VCP) examples 216, 218 and 220 for a femtocell, in accordance with one embodiment of the present invention.

As is apparent from the above, an efficient synchronization point at a femtocell depends upon the CP duration. Because the FFT of a received signal at a femtocell is based on that portion of the signal remaining after the CP has been removed, the true synchronization point is the beginning of the data period. Typically, the same CP duration is selected for both the macrocell network and the femtocell network to avoid interference arising from different CP durations. However, in a femtocell network, the maximum excess delay (MED) of the multipath components are typically much less than the MED of a macrocell network. For example, based on ITU-R channel models, the MED for an indoor femtocell is on the order of 0.5 microseconds, while the MED for a vehicular macrocell is up to 20 microseconds. Furthermore, for an fBS which is very close to an mBS, the MDS may also be small (given by 2d/c, as mentioned above). Therefore, the CP duration at a femtocell (in order to accommodate both the MDS and MED) may be selected to be considerably less than the CP duration of a macrocell. FIG. 11 provides three variable CP (VCP) examples 216, 218 and 220 for a femtocell, in accordance with one embodiment of the present invention. In FIG. 11, the CP duration at the macrocell is denoted by $N_{CP-1}$, and the CP duration at the femtocell is denoted by $N_{CP-2}$.

In example 216, the femtocell leaves a silent period of duration ($N_{CP-1}-N_{CP-2}$) before transmitting its CP. This silent period allows macrocell 202 and the femtocell 206 to both use the same FFT size, thus avoiding potential interference. A power savings may then be achieved at the femtocell by avoiding energy use on the CP at each symbol. The silent period may also be provided immediately following the data period.

In example 218, the femtocell utilizes a CP duration which is less than the CP duration used in the macrocell; however, the femtocell uses the extra time (i.e., the difference in duration between a macrocell CP and the femtocell CP) to transmit additional data. Therefore, femtocell 210 uses a larger FFT than macrocell 202. In this example, even though the femtocell extends the data period by ($N_{CP-1}-N_{CP-2}$), ICI appears in the femtocell's subcarriers. If the extra subcarrier gain is significant, and the resulting ICI is manageable at the femtocell, the variable CP in example 218 may provide improvement in data transmission.

In example 220, the femtocell uses a shorter CP duration 212, and the same FFT size as macrocell network 214, and does not provide a silent period between symbols (as in example 216). However, as seen in FIG. 11, under this arrangement, the femtocell loses synchronization with the macrocell network immediately after the first symbol. Therefore, example 220 is not a feasible method for efficient synchronization.

Figure 12:
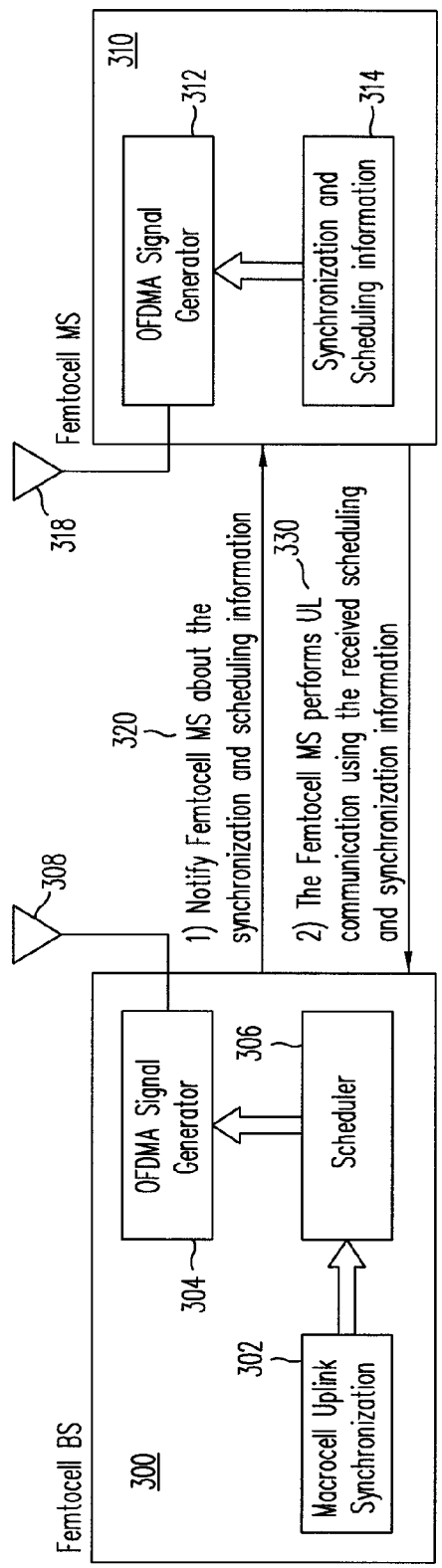
FIG. 12 illustrates an example of how scheduling information are utilized at both fBS 300 and a fMS 310, according to one embodiment of the present invention.

FIG. 12 illustrates an example of how scheduling information are utilized at both fBS 300 and fMS 310, according to one embodiment of the present invention. As shown in FIG. 12, at step 302 fBS 300 first performs UL synchronization to the macrocell in which fBS 300 is located. The UL synchronization may be achieved according to a selected synchronization scheme (e.g., either of the synchronization schemes illustrated by FIGS. 9(a) and 9(b)). Then, a scheduling decision (e.g., assignment of subcarriers for the fMSs) is made by a scheduler at step 306 to reduce ICI observed by the fMSs. Alternatively, macrocell synchronization step 302 and scheduling step 306 may be performed in a single step ("jointly") to reduce ICI. The synchronization and scheduling information is then communicated at step 320 to fMS 310. At step 314, this received information is stored in fBS 310 to drive signal generator 312 of OFDMA signals. At step 330, fMS 310 transmits uplink to fBS 300 accordingly.

Referring back to FIGS. 9(a) and 9(b), accurate synchronization to the first user's delay $\tau_1$ may be used (e.g., at steps 20, 30 and 35) to reduce ICI. As discussed above, assuming single-user signal conditions, prior art techniques use a correlation window length that is equal to the CP duration of the signal. However, as also discussed above, in the presence of multiple users, the received OFDMA signal is pairwise correlated with the signals of the other users (FIG. 4). Hence, according to a further embodiment of the present invention, a correlation window length longer than the CP duration may be used to more accurately synchronize to the first arriving user signal.

Figure 13:
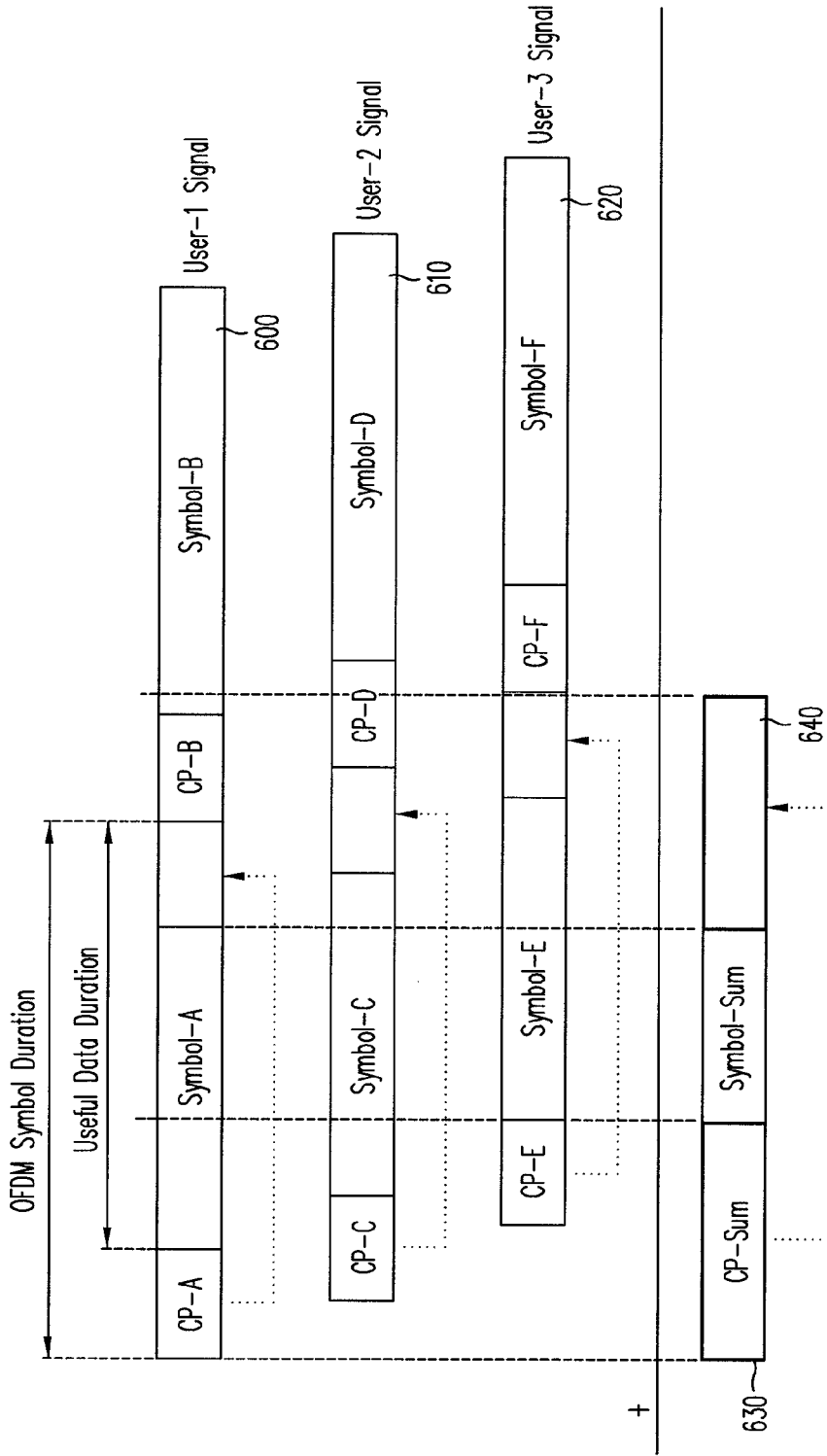
FIG. 13 illustrates how a greater data duration of an OFDM signal becomes pairwise correlated in the presence of multiple users, in accordance with one embodiment of the present invention.

FIG. 13 illustrates how a greater data duration in an OFDM signal becomes pairwise correlated in the presence of multiple users, in accordance with one embodiment of the present invention. As shown in FIG. 12, signals 600, 610 and 620 from three users are received at an fBS with different delays. As the CP of a symbol is the portion of the symbol transmitted at the end of the data period (by definition), a sample within the CP duration is pairwise correlated with a corresponding sample that is at the end of the data period. When the three users' signals are combined, a multiuser OFDM signal results, a greater number of samples in the multiuser OFDM signal are pairwise correlated. This is illustrated in FIG. 13, where signal portion 630 includes the signals transmitted during the three users' CP durations, and signal portion 640 includes the corresponding correlated portion of the data period. Therefore, to accurately synchronize to the first arriving user, an optimal correlation window length is expected to be longer than each of the individual CP durations, and is expected to equal combined duration 640 of the individual CP durations.

Figure 14:
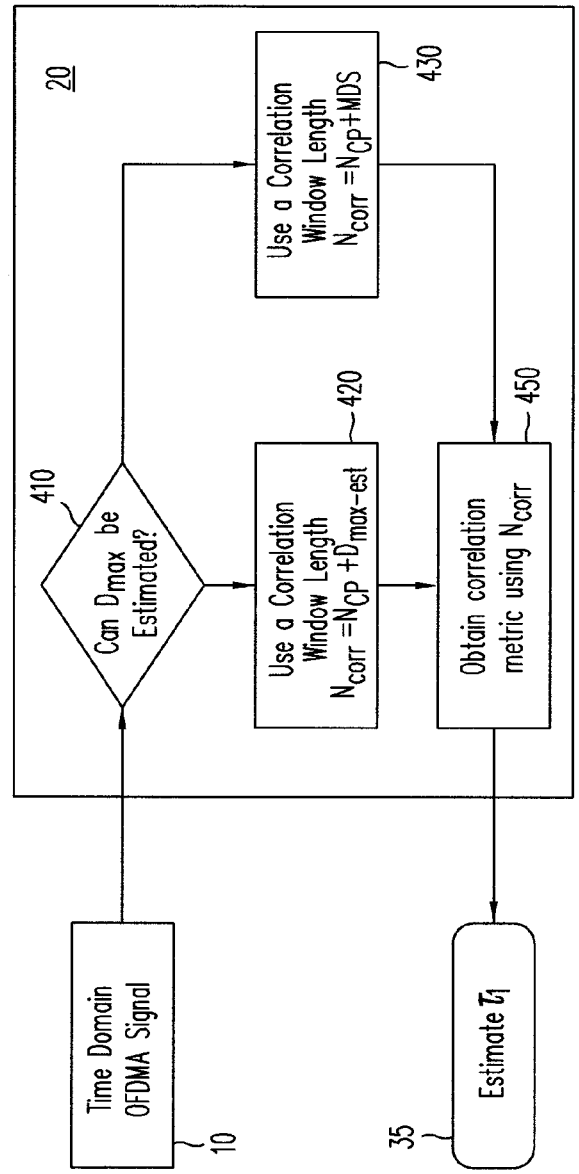
FIG. 14 illustrates using an extended correlation window length to obtain a correlation metric for blind synchronization, in accordance with one embodiment of the present invention.

FIG. 14 illustrates using an extended correlation window length to obtain a correlation metric for blind synchronization, in accordance with one embodiment of the present invention. In this detailed description, the length $N_{corr}$ of an extended correlation window is denoted by $N_{corr}=N_{CP}+D_{max}$ where $D_{max}$ is a positive integer. Ideally, $D_{max}$ is the delay between the first arriving user and the latest arriving user in an AWGN channel. In a multipath channel, the maximum excess delay of the latest arriving signal may be added to $D_{max}$. In a practical situation, $D_{max}$ may be estimated (at step 410). If $D_{max}$ can be estimated (the estimated value is denoted "$D_{max-est}$"), at step 420, the correlation window length may be set to $N_{corr}=N_{CP}+D_{max-est}$. $D_{max-est}$ may be estimated, for example, by the receiver obtaining a correlation metric by computing a number of correlations using correlation window lengths that are shorter than the CP duration $N_{CP}$. These correlations provide a greater granularity for the user delays. By setting a threshold on the correlation metric, $D_{max-est}$ may be roughly estimated. Otherwise, $D_{max}$ may not be estimated, the information from the network topology can be utilized to obtain an approximation for $D_{max}$. In particular, the fBS-mBD distance may be used to obtain MDS (e.g., using a method of step 70 from FIG. 9(b)) to approximate $D_{max}$. Then, at step 430, the correlation window length is set to $N_{corr}=N_{CP}+MDS$. Using the extended correlation window, the correlation metric may be calculated (step 450), which can then be used at step 35 to determine the first arrival time $\tau_1$.

Figure 15A:
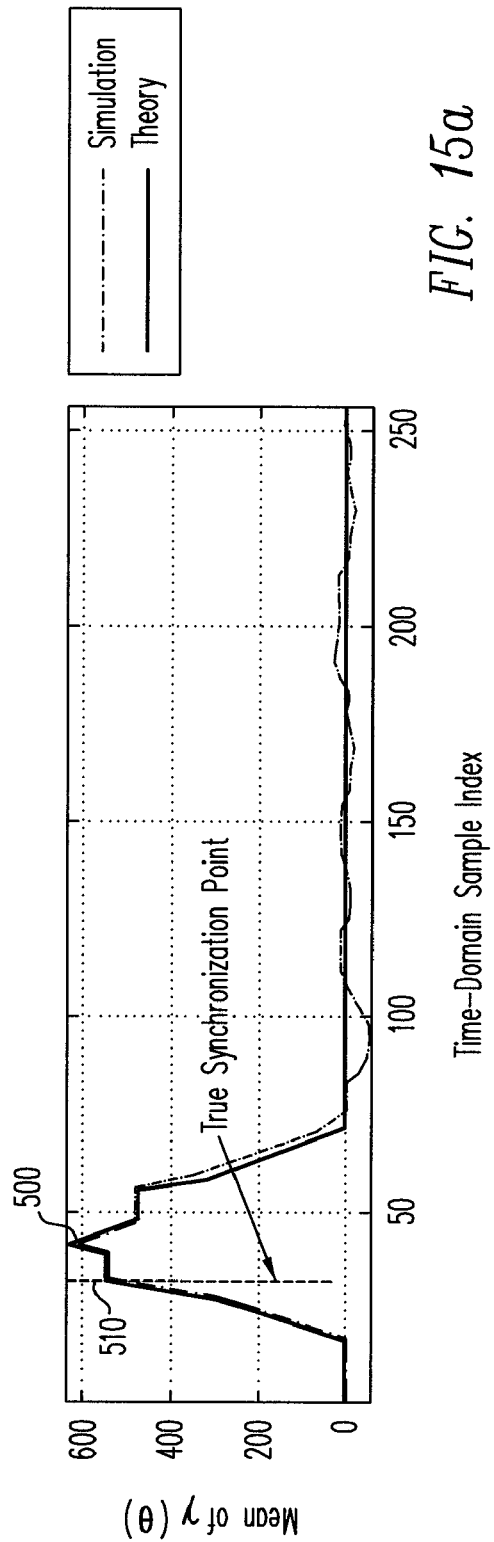
FIG. 15 shows both the theoretical and simulated means and variances of the correlation metric using a conventional correlation window length (i.e., $N_{corr}=N_{CP}$, $D_{max}=0$).
Figure 15B:
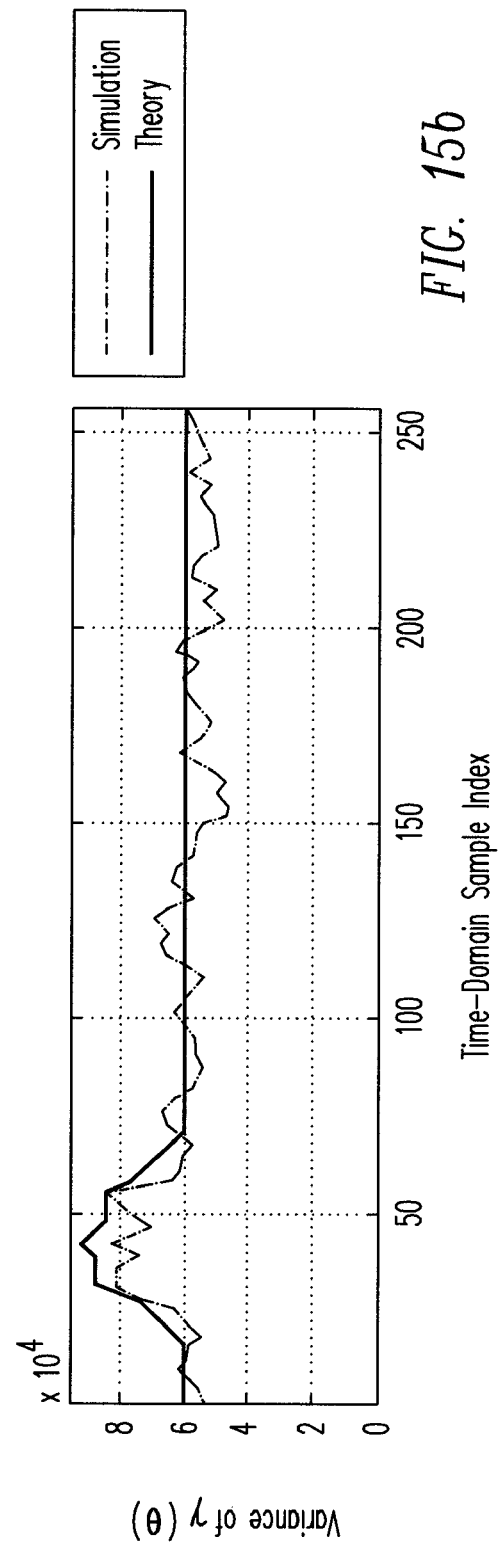

FIGS. 15 and 16 provide simulation and analytical results for the correlation metric for three users, using as 256 samples as the number of OFDM samples per symbol, 16 samples as the CP duration, and assuming each of the three users uses 64 orthogonal subcarriers. The delays of the three users are assigned 32, 42, and 55 samples, respectively. FIG. 15 shows both the theoretical and simulated means and variances of the correlation metric using a conventional correlation window length (i.e., $N_{corr}=N_{CP}$, $D_{max}=0$). Because of other users, the correlation function is maximized at sample 500, which is later in time than true synchronization point 510. However, as shown in FIG. 16, when an extended correlation window is used (e.g., using $N_{corr}=N_{CP}+D_{max}$, where $D_{max}=23$), a single correlation peak 520 is seen, which appears at the true synchronization instant for the first user.

The above detailed description is provided to illustrate the specific embodiments of the present invention and is not intended to be limiting. Numerous variation and modifications of the present invention are possible. The present invention is set forth in the following accompanying claims.

We claim:

1. A method for reducing interchannel interference in a femtocell network within a coverage area of a macrocell network, the macrocell network and the femtocell network being both orthogonal frequency division multiple access (OFDMA) systems, the method comprising:

using a correlation metric, determining arrival times of signals from mobile users of the macrocell network received at a base station of the femtocell network including determining a first arrival time for a first arriving one of the signals from the mobile users and determining a last arrival time for a last arriving one of the signals from the mobile users;

determining whether a delay between the first arrival time and the last arrival time is greater than a cyclic prefix (CP) period for the femtocell network; and synchronizing transmission times by users of the femtocell network based on a synchronization point derived according to the determined arrival times, wherein the synchronization point equals the first arrival time if the arrival times fall within the CP period and wherein the synchronization point equals the first arrival time plus an additional delay derived from the correlation metric.

2. A method as in claim 1, wherein signals from multiple mobile stations of the macrocell are present within a coverage area of the femtocell network.

3. A method as in claim 1, where mobile stations of the macrocell network are synchronized to a base station of the macrocell network.

4. A method as in claim 3, where the delay is substantially 2d/c, with d denoting the distance between a base station of the macrocell network and a base station of the femtocell network and c denoting the speed of light.

5. A method as in claim 1, wherein the first arrival time is identified according to a threshold on the correlation metric.

6. A method as in claim 1, wherein the first arrival time is identified by selecting from multiple peaks the one peak that has the earliest delay.

7. A method as in claim 1, wherein the signals in the femtocell network have a cyclic prefix having a different duration than cyclic prefixes in signals of the macrocell network.

8. A method as in claim 7, wherein the cyclic prefix in the femtocell network has a shorter duration than cyclic prefix in signals of the macrocell network, and wherein signals in the femtocell network have a symbol duration that is longer than symbol durations in signals of the macrocell network.

9. A method as in claim 8, wherein the femtocell network transmits more data during its symbol duration, relative to the symbol duration of the macro cell network.

10. A method as in claim 8, wherein a combined duration of the duration of the cyclic prefix and the symbol duration in the femtocell network equals a combined duration of the duration of the cyclic prefix and the symbol duration in the macrocell network.

11. A method as in claim 7, wherein the symbol durations in the macrocell network and the femtocell network are equal.

12. A method as in claim 11, wherein the macrocell network and the femtocell network uses the same FFT size to process data periods in their respective signals.

13. A method as in claim 7, wherein signals in the femtocell network include a silent period between symbol transmissions.

14. A method as in claim 13, wherein the silent period equals the difference between a duration of the cyclic prefix of a signal in the femtocell network and a duration of the cyclic prefix in a signal in the macrocell network.

15. A method as in claim 1, where the base station of the femtocell network computes an interchannel interference metric and uses the synchronization point and the interchannel interference metric to schedule the transmission times.

16. A method as in claim 15, wherein the base station of the femtocell assigns subcarriers to the users of the femtocell.

17. A method as in claim 16, wherein the base station of the femtocell assigns a subcarrier to a user according to the interchannel interference metric for the subcarrier at the synchronization point computed at the time of assignment.

18. A method as in claim 1, wherein the correlation metric is computed using a correlation window with a longer duration than a duration of a cyclic prefix of signals in the macrocell network.

19. A method as in claim 17, wherein the duration of the correlation window is determined using a thresholding method.

20. A method as in claim 17, where the duration of the correlation window is determined according to a distance between the base station of the femtocell network and a base station of the macrocell network.

21. A method as in claim 1, wherein the correlation metric is based on Beek's estimator.

22. A method as in claim 1, wherein the correlation metric is based on Muller's estimator.

23. A method as in claim 1, wherein the correlation metric is based on Speth's estimator.

24. A method as in claim 1, wherein the correlation metric is based on a correlation-based timing estimator.

* * * * *